United States Patent [19]
Lynch et al.

[11] Patent Number: 5,996,206
[45] Date of Patent: Dec. 7, 1999

[54] METHOD AND APPARATUS FOR INSTALLING AND ALIGNING PUNCHES IN AN IMAGING SYSTEM

[75] Inventors: Richard J. Lynch, Peabody, Mass.; Robert P. Flanagan, Jr., Kittery, Me.; Libor Krupica, Methuen; Steven Anella, Melrose, both of Mass.; James D. Waterman, Newton, N.H.

[73] Assignee: Agfa Corporation, Wilmington, Calif.

[21] Appl. No.: 09/028,734

[22] Filed: Feb. 24, 1998

[51] Int. Cl.⁶ ...................................................... B23Q 3/00
[52] U.S. Cl. ................................... 29/464; 83/54; 83/619; 346/134; 346/138
[58] Field of Search .................................. 29/464; 83/54, 83/619; 346/138, 134

[56] References Cited

U.S. PATENT DOCUMENTS

| | | |
|---|---|---|
| 4,509,397 | 4/1985 | Mori et al. ................................. 83/453 |
| 5,598,739 | 2/1997 | Blake et al. . |
| 5,655,452 | 8/1997 | Blake et al. . |
| 5,671,005 | 9/1997 | McNay et al. . |

*Primary Examiner*—P. W. Echols
*Assistant Examiner*—John C. Hong
*Attorney, Agent, or Firm*—Robert A. Sabourin

[57] ABSTRACT

A method and apparatus for facilitating the installation and alignment of side punches onto the internal drum of an imaging system. A side of the internal drum is provided with a T-shaped slot for movably positioning a plurality of side punches about the cylindrically shaped imaging surface of the internal drum. The proper radial alignment of the side punches along the T-slot is achieved using a unique band template. The band template includes a plurality of notches, each of which indicates the correct positioning of the pin of a side punch to be installed on the internal drum.

32 Claims, 9 Drawing Sheets

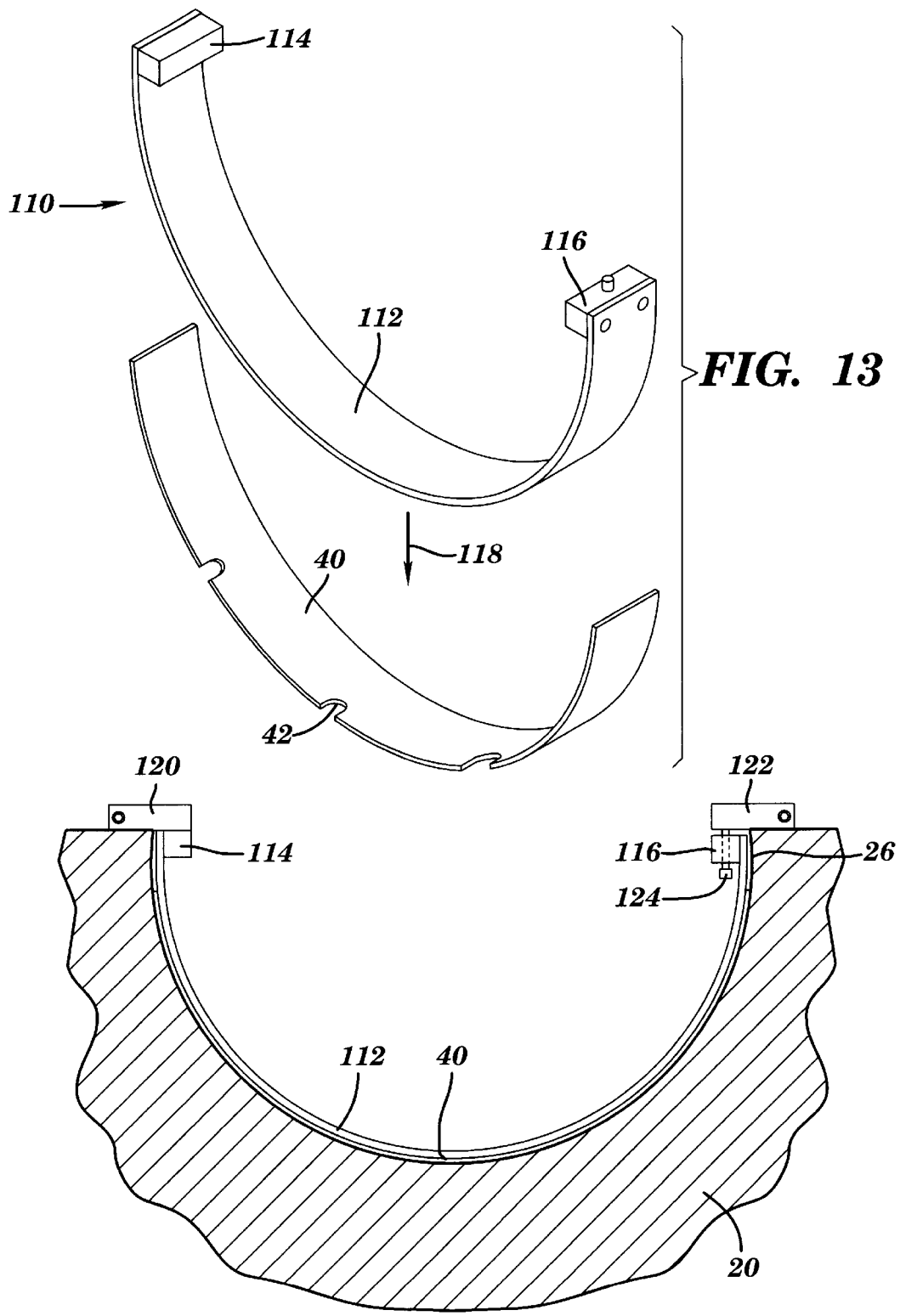

METHOD AND APPARATUS FOR INSTALLING AND ALIGNING PUNCHES IN AN IMAGING SYSTEM

FIELD OF THE INVENTION

The present invention is in the field of imaging systems. More specifically, the present invention provides a method and apparatus for installing and aligning side punches onto the internal drum of an imagesetter, platesetter, or other imaging system, at any field or customer location.

BACKGROUND OF THE INVENTION

Currently, side punches must be installed on the internal drum of an imagesetter or platesetter at a factory site using complex alignment fixtures and tooling. This increases the cost of the system, often causes delays in filling orders, and commonly requires the modification of completed and boxed systems.

SUMMARY OF THE INVENTION

The present invention provides a method and apparatus for facilitating the installation and alignment of side punches onto the internal drum of an imaging system. A side of the internal drum is provided with a "T"-shaped slot (hereinafter referred to as a T-slot) for movably positioning a plurality of side punches about the cylindrically shaped imaging surface of the internal drum. The proper radial alignment of the side punches along the T-slot is achieved using a unique band template. The band template includes a plurality of notches, each of which indicates the correct positioning of the pin of a side punch to be installed on the internal drum.

Generally, the present invention provides a method for installing a plurality of punches on an internal drum of an imaging system, comprising the steps of:

installing a first punch onto the internal drum;
  providing a band template having a plurality of notches each configured to receive a punch pin of one of the plurality of side punches therein;
  positioning the band template on the internal drum such that a punch pin of the first punch is located within a predetermined one of the notches in the band template;
  positioning a punch pin of each of the remaining punches to be installed onto the internal drum into an empty one of the notches on the band template; and
  installing each of the remaining punches onto the internal drum.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 13 illustrates an alternate technique, using a crowder, for compressing the band template against the imaging surface of the internal drum;

FIG. 14 illustrates the attachment of the crowder onto the internal drum;

DETAILED DESCRIPTION OF THE INVENTION

Figure 1:
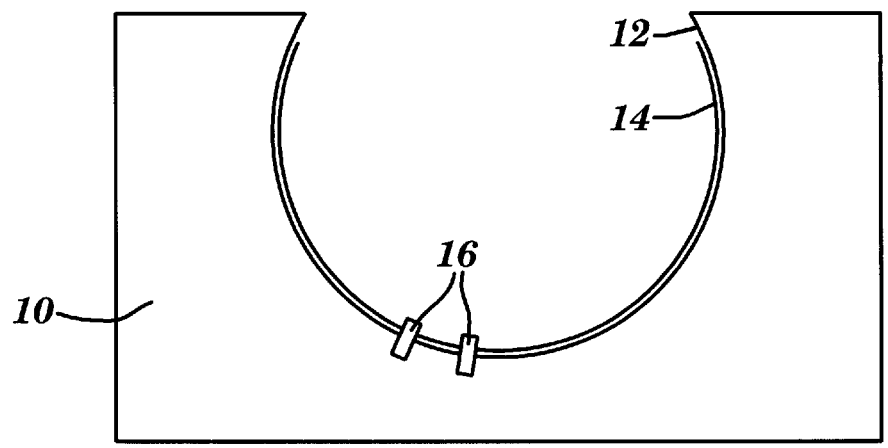
FIG. 1 illustrates an internal drum having a plurality of side punches mounted thereon in accordance with the prior art.

The features and advantages of the present invention are illustrated in detail in the accompanying drawings, wherein like reference numerals refer to like elements throughout the drawings.

An end view of a prior art type internal drum 10, used in applications such as an imagesetter or platesetter, is illustrated in FIG. 1. The internal drum 10 includes a cylindrical imaging surface 12 for supporting a supply of recording media 14 during imaging. Imaging systems incorporating an internal drum are disclosed, for example, in U.S. Pat. Nos. 5,598,739, 5,655,452, and 5,671,005, which are hereby incorporated by reference.

As known in the art, many imaging systems are equipped with internal punches which are configured to punch a predetermined set of holes into the recording media being imaged. In FIG. 1, for example, a plurality of side punches 16 are shown mounted to an end of the internal drum 10. Advantageously, by registering the recorded image to the set of holes in the recording media, accurate registration throughout the prepress process can be achieved. Unfortunately, as noted above, the installation and alignment of head, tail, and/or side punches on an internal drum, as practiced in the prior art, generally requires the use of complex and expensive alignment fixtures which are only available at a factory location.

The present invention obviates these and other disadvantages associated with the prior art, by providing a unique method and apparatus for accurately installing and aligning side punches onto the internal drum of an imaging system at any field or customer location.

Figure 2:
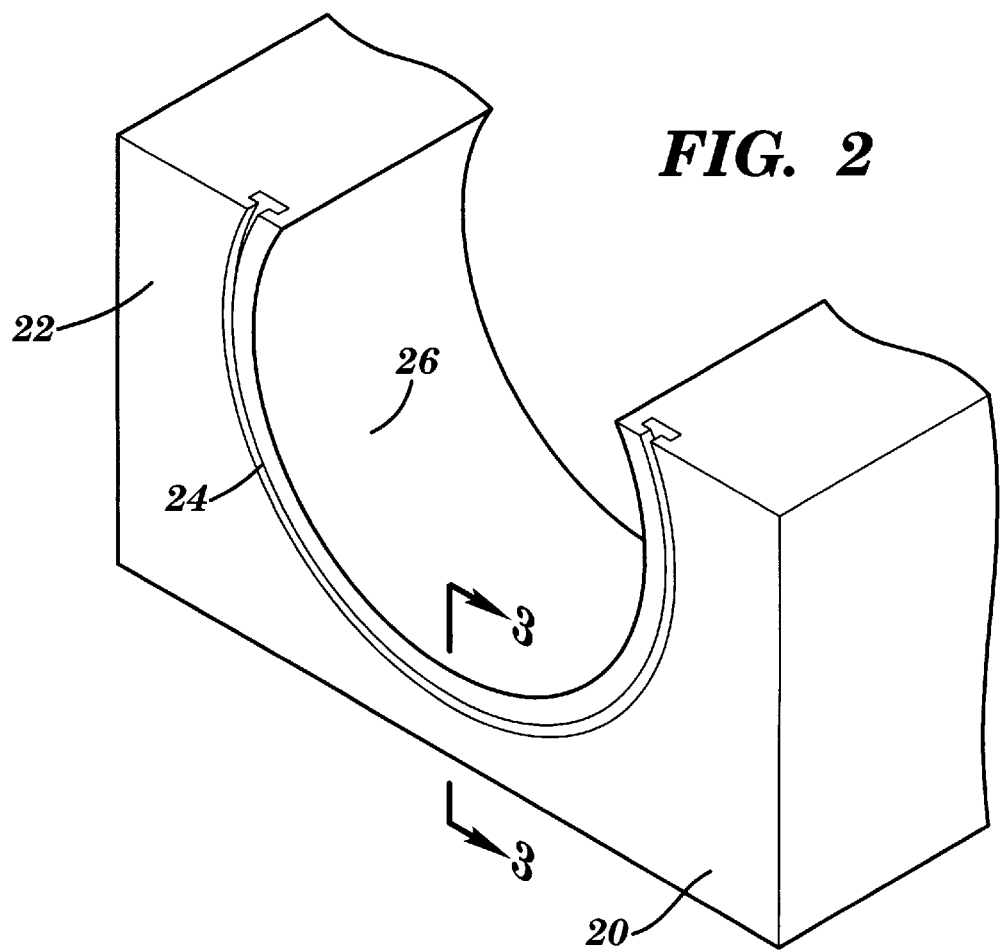
FIG. 2 illustrates an internal drum configured in accordance with a preferred embodiment of the present invention.

Referring now to FIG. 2, there is illustrated a partial perspective view of an internal drum 20 configured in accordance with a preferred embodiment of the present invention. Although the present invention is described hereinbelow with regard to the installation and alignment of side punches, it should be noted that the T-slot and band template technique of the present invention is also applicable to the installation and alignment of head, tail, and other types of internal punches commonly used in conjunction with an internal drum imaging system.

The side 22 of the internal drum 20 onto which the side punches are to be installed is provided with a T-slot 24 which is configured to follow the curvature of the cylindrically shaped imaging surface 26 of the internal drum 20. The T-slot 24 is machined or otherwise suitably formed in the side of the internal drum. As will be described in greater detail below, one or more side punches may be movably mounted at various positions along the T-slot 24 to provide an infinite number of side punch configurations. Other types of guides may, of course, be used in lieu of the T-slot 24 for the installation of the side punches without departing from the intended scope of the present invention.

Figure 3:
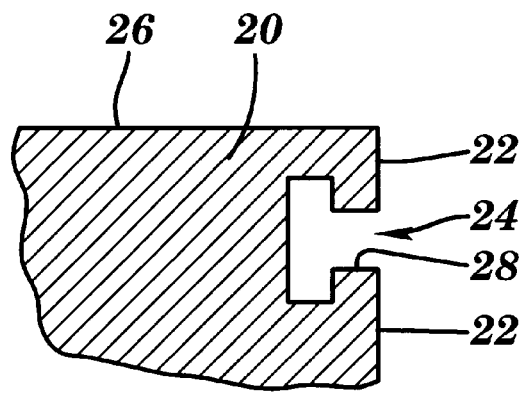
FIG. 3 is a cross-sectional view of the internal drum taken along line 3—3 of FIG. 2, illustrating in detail the T-slot of the present invention.
Figure 4:
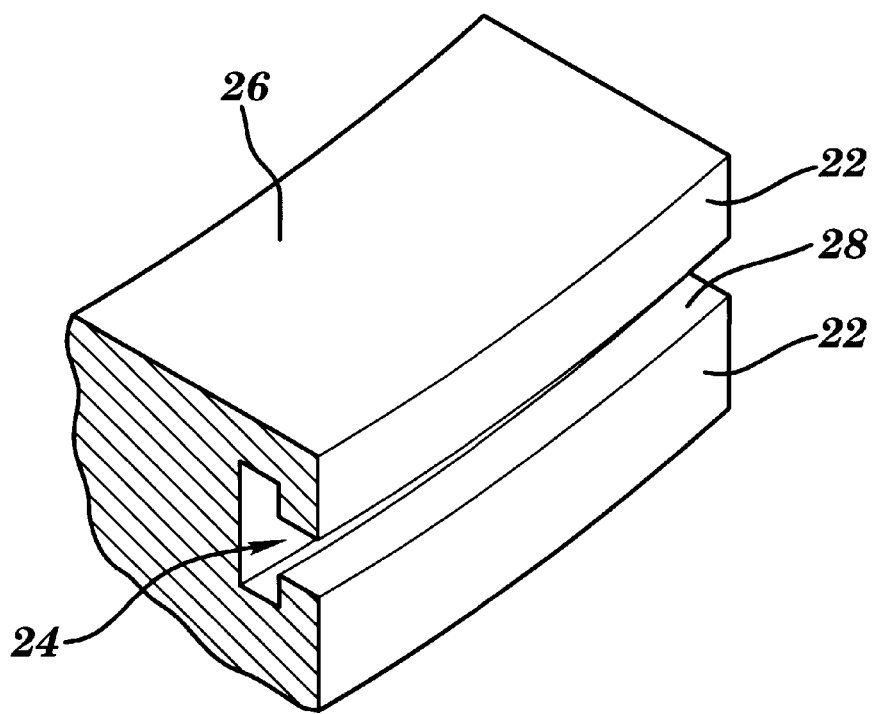
FIG. 4 is a perspective view of the cross-section illustrated in FIG. 3.
Figure 5:
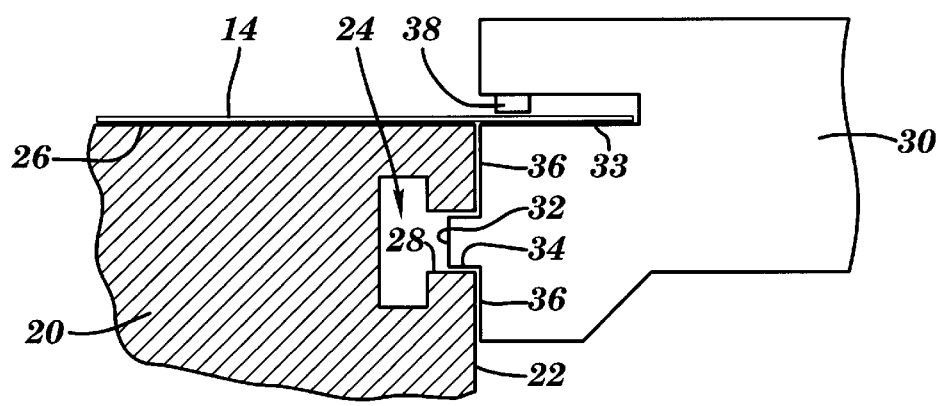
FIG. 5 is a partial cross-sectional view illustrating the positioning of a side punch within the T-slot of FIG. 3.

As shown in greater detail in FIGS. 3 and 4, the T-slot 24 includes a radial alignment control surface 28 for defining the radial location of each side punch along the T-slot. As illustrated in FIG. 5, each side punch 30 includes a lip 32 having a bottom surface 34 which is configured to engage the radial alignment control surface 28. Preferably, the bottom surface 34 of the lip 32 is provided with a curvature matching the curvature of the radial alignment control surface 28. The lip 32 additionally serves to align the media surface 33 of the side punch with the imaging surface 26 of the internal drum 20.

The side 22 of the internal drum 20 is provided with a perpendicular face. The perpendicularity of each side punch 30 to the plane defined by the face of the internal drum 20 is achieved by positioning the planar surfaces 36 on opposing sides of the lip 32 of the side punch 30 against the perpendicular face of the internal drum 20.

Each side punch 30 is designed to be selectively and interchangeably mounted at any position along the T-slot 24, depending upon the desired punch configuration. Each side punch 30 includes a round, slotted, or other shaped punch pin 38 for punching a hole or notch into the recording media 14 positioned on the internal drum 20 in a manner known in the art. The side punches 30 may have identical or different punch specifications (e.g., punch type, shape, size, manufacturer).

Figure 6:
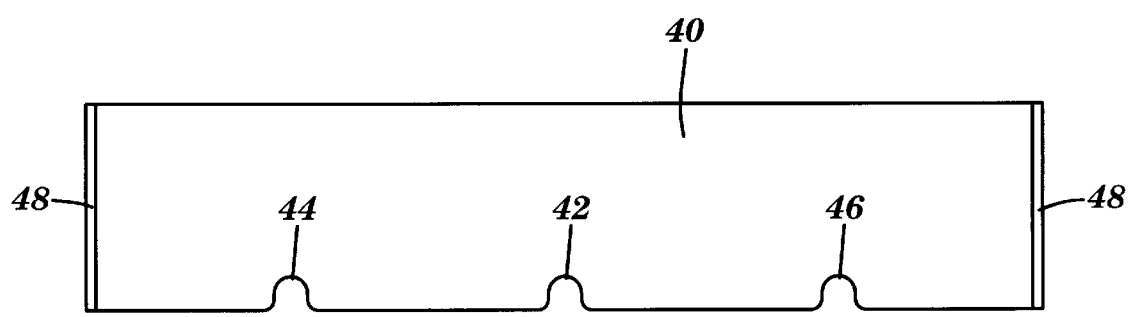
FIG. 6 illustrates a band template in accordance with the present invention.

The interpunch spacing between the side punches 30 to be installed on the internal drum 20, and the orientation of the punch pattern, is defined by a band template. An example of a band template 40 according to the present invention is illustrated in FIG. 6.

Generally, the band template 40 includes a plurality of notches configured to mate with the punch pins 38 of the side punches 30 to be installed on the internal drum 20. In FIG. 6, for example, the band template 40 includes a center notch 42, a second notch 44, and a third notch 46. The number, size, shape, and other attributes of the notches formed in the band template 40 may vary according to the specific side punch configuration to be installed on the internal drum 20. Each notch 42, 44, 46 in the band template 40 is of the same shape as the punch pin 38 of the side punch 30 to be located at that position on the internal drum 20. As detailed below, the center notch 42 is used to reference the center side punch to the center of scan to ensure the precise alignment of the side punches 30 on the internal drum 20.

The band template 40 is flexible, and is preferably manufactured from 0.010" stainless steel stock. The band template 40 should be burr free to protect the surface of the internal drum where contact will occur during installation of the side punches. In a first embodiment, each end of the band template includes a ninety (90) degree bend 48 which is used during installation on the internal drum 20 as a contact surface for an installation tool. The length of the band template 40 is dependent upon the maximum interpunch spacing and the design of the installation tool. This length is preferably a fixed dimension for all band templates for a given size internal drum.

The notches 42, 44, 46, which are cut or otherwise suitably formed in the band template 40, determine the interpunch spacing of the punch pattern to be used in the internal drum 20. The specific size and shape of each notch 42, 44, 46 formed in the band template 24 are determined by the shape of the punch pin 38 that is to be located by that notch. Preferably, each notch 42, 44, 46 is sized and shaped to provide a tight fit around a corresponding punch pin 38 to ensure the accurate interpunch spacing of the side punches. The notch can be chamfered for ease of entry and exit of the punch pin 38. Alternately, each notch 42, 44 may be provided with one registration edge, preferably the edge closest to the center side punch. The other edge of each notch 44, 46 does not contact the punch pin, thereby providing a gap which facilitates removal of the band template. The center notch 42, however, is still configured to snugly engage the punch pin of the center punch to accurately register the band template to the internal drum.

Figure 7:
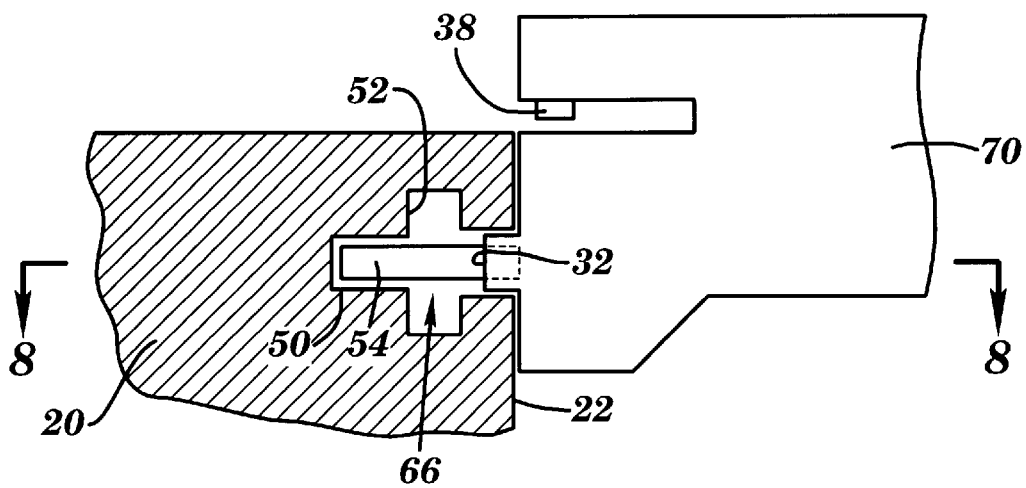
FIG. 7 is a partial cross-sectional view illustrating the alignment of the center side punch to the punch registration point corresponding to the center of scan.
Figure 8:
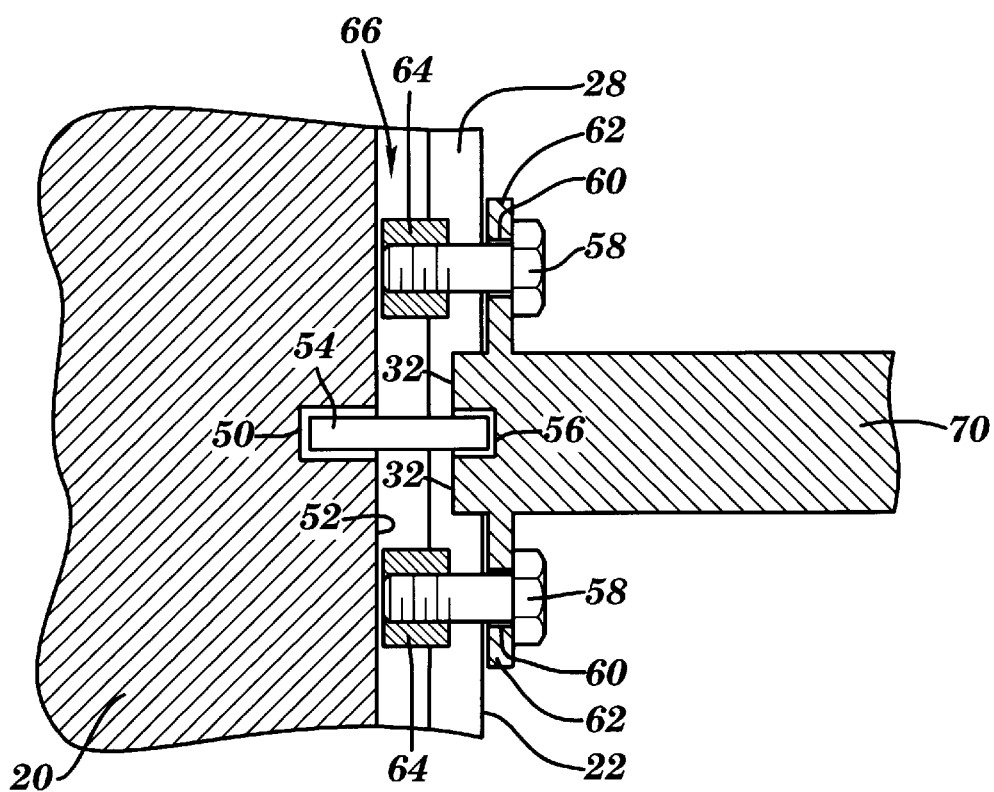
FIG. 8 is a partial cross-sectional view illustrating the coupling of the pin defining the punch registration point with the center alignment slot of the center side punch, and the securement of the center side punch to the internal drum.

The punch pattern defined by the notches 42, 44, 46 of the band template 40 is accurately located on the drum by utilizing a punch registration point that identifies the center of scan of the internal drum 20. In the present invention, as illustrated in FIGS. 7 and 8, the punch registration point is defined by a hole 50 formed in the inside face 52 of the T-slot 24. A pin 54 or similar structure, inserted in the hole 50, snugly engages a complementary center alignment slot 56 or other attachment structure formed on the lip 32 of the center side punch 70 to position the center side punch 70 on the internal drum 20. If there is no center side punch 70 in the punch pattern, then a temporary punch, or one of the side punches 30, will temporarily act as the center side punch to position the band template 40 on the internal drum 20. Each of the side punches 30 may be provided with a center alignment slot 56 to allow it to be used as a center side punch 70.

Figure 9:
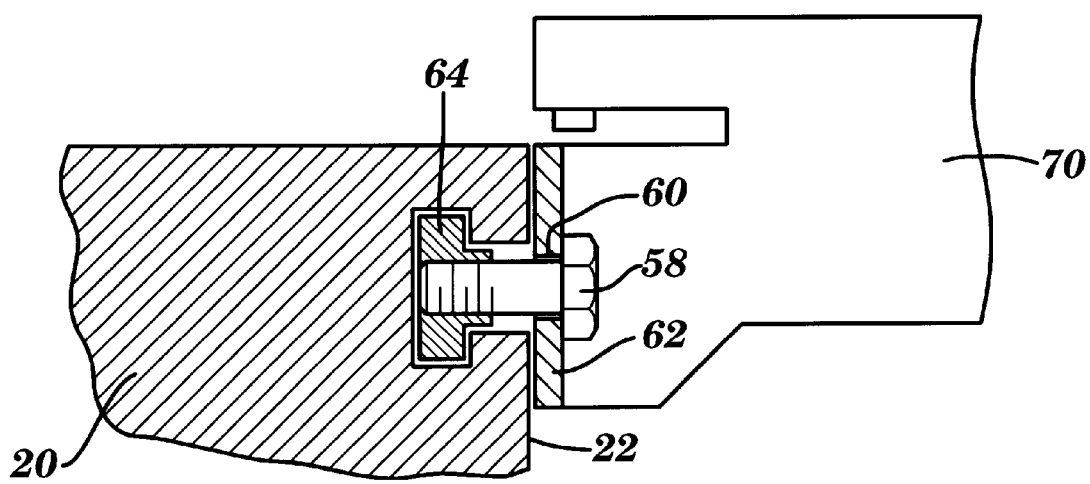
FIG. 9 is a partial cross-sectional view illustrating one embodiment of the hardware for securing a side punch to the side of the internal drum.

Once aligned to the center of scan as detailed above, the center side punch 70 is secured against the side 22 of the internal drum 20. For example, as illustrated in FIG. 8, a pair of bolts 58, each inserted through an opening 60 in a flange 62 of the center side punch 70, are threaded into a corresponding pair of nuts 64 disposed within the head portion 66 of the T-slot 24. As further shown in FIG. 9, each nut 64 may be T-shaped to conform to the shape of the T-slot, thereby ensuring a secure attachment of the punch against the side 22 of the internal drum 20. It should be noted, however, that other types of mounting hardware may also be used to secure the center side punch 70 to the internal drum 20.

Figure 10:
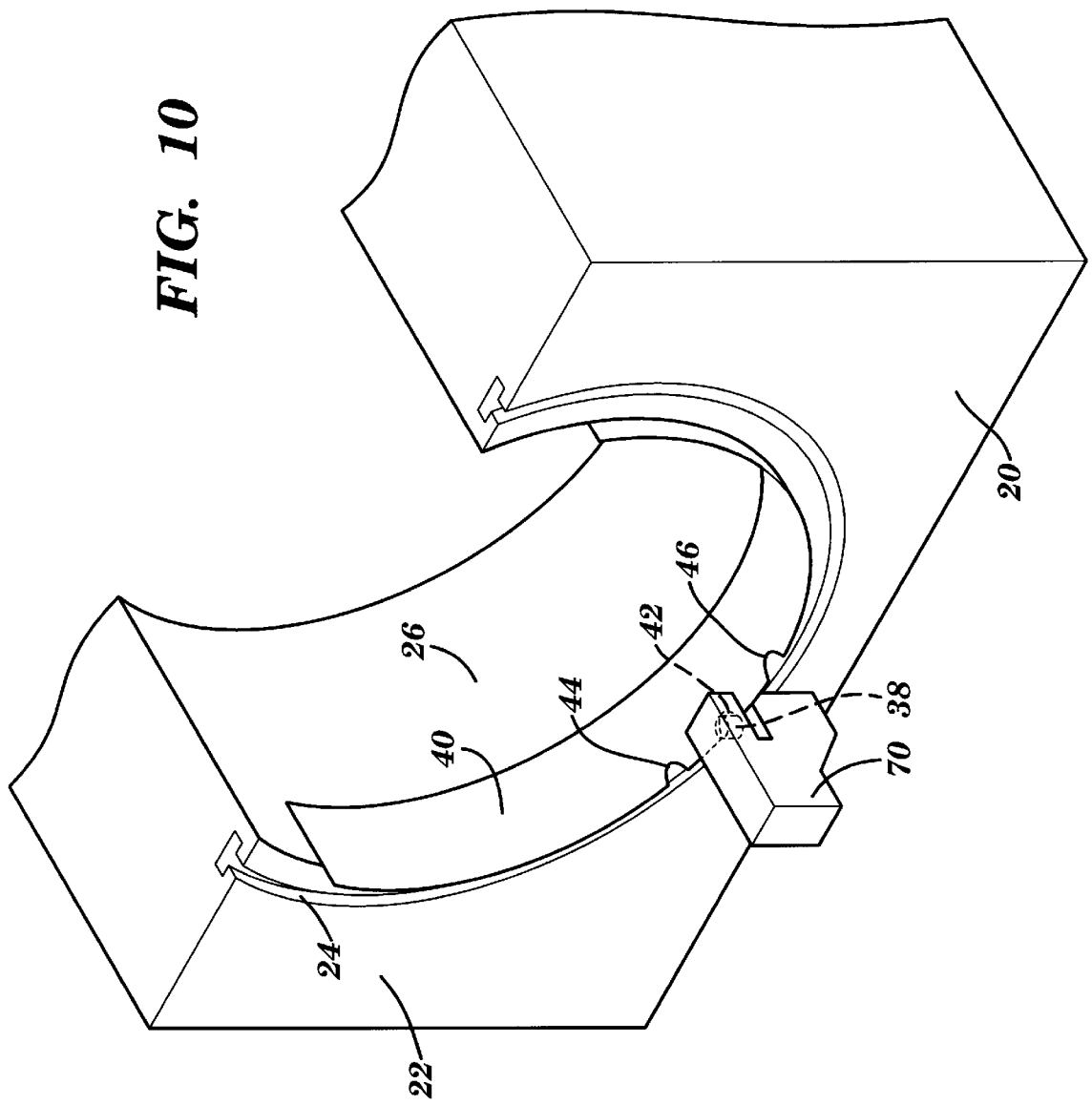
FIG. 10 illustrates the band template positioned on the imaging surface of the internal drum.

The center side punch 70, once fixed in position on the internal drum 20, serves as a reference point for the band template 40, and for the subsequent installation of the remaining side punches 30. The band template 40 is bowed and positioned within the internal drum 20, with the center notch 42 mated with the punch pin 38 of the previously installed center side punch 70, such that the bottom surface of the band template 40 is in contact with the imaging surface 26 of the internal drum 20. When disposed on the imaging surface 26 of the internal drum 20 in this manner, as illustrated in FIG. 10, the remaining notches 44, 46 of the band template 40 are accurately positioned at the locations where the punch pins 38 of the remaining side punches 30 are to be located. The punch pin 38 of each remaining side punch 30 is subsequently inserted into the corresponding notch in the band template 40, and the side punch is installed onto the side 22 of the internal drum 20 in a manner similar to that of the center side punch 70. After the installation of the remaining side punches 30, the band template 40 is removed from the internal drum 20. If a temporary punch was used in lieu of the center side punch 70 to position the band template 40 onto the internal drum 20 (e.g., if the punch pattern did not require a center hole/notch), the temporary punch is also removed. If one of the side punches 30 to be installed was temporarily used as the center side punch 70 to position the band template 40 onto the internal drum 20, it is removed and reinstalled on the drum after at least one other side punch 30 has been installed thereon.

A number of methods may be used to bend the band template 40 such that it fully contacts the cylindrically shaped imaging surface 26 of the internal drum 20. A first method employs a pair of cam lever tools which are configured to apply a compressive force against the ninety degree bends 48 (FIG. 6) formed on the opposing ends of the band template 40. Preferably, the compressive force is applied after the center notch 42 of the band template 40 has been mated with the punch pin 38 of the installed center side punch 70, thereby ensuring that the band template 40 is properly aligned on the internal drum 20.

Figure 11:
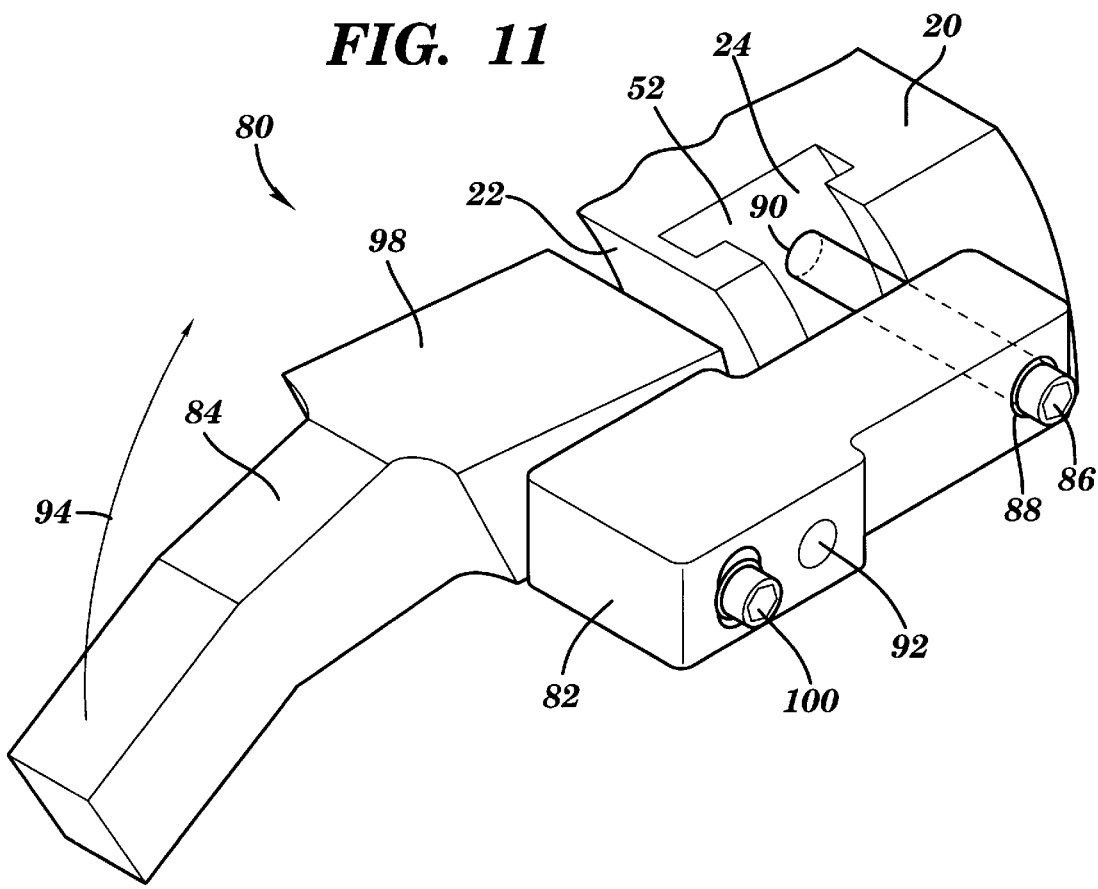
FIG. 11 illustrates a cam lever tool for compressing the band template against the imaging surface of the internal drum.

An example of a cam lever tool 80 in accordance with a preferred embodiment of the present invention is illustrated in FIG. 11. The cam lever tool 80 includes a cam mount 82 for mounting the cam lever tool 80 to the internal drum 20, and a cam lever 84 for applying a compressive force against the end of the band template 40. One cam lever tool 80 is mounted at a predetermined position on each side of the internal drum 20.

The cam mount 82 may be secured to the internal drum 20 in a number of ways. For example, bolting hardware, such as in that illustrated in FIG. 9, may be used. Alternately, as shown in FIG. 11, an attachment screw 86, positioned within a screw hole 88 formed through the cam mount 82, may be inserted into a mounting hole 90 formed in the inside face 52 each end of the T-slot 24.

Figure 12:
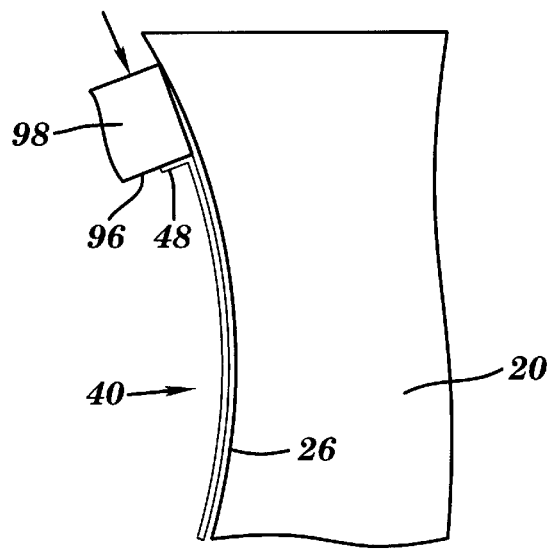
FIG. 12 illustrates the engagement of the cam lever tool of FIG. 11 with one end of the band template of FIG. 6.

The cam lever 84 is pivotally mounted to the cam mount 82 at pivot point 92 using any suitable pivot hardware. When the cam lever 84 is pivoted in the direction indicated by directional arrow 94, a bottom surface 96 (FIG. 12) of the head 98 of the cam lever 84 engages one of the ninety degree bends 48 of the band template 40 previously positioned on the internal drum. When both of the cam lever tools 80 are manipulated in this manner, the band template 40 is compressed against the imaging surface 26 of the internal drum 20. Thereafter, to maintain the compression of the band template 40, the cam lever 84 is locked in position using a locking screw 100 or similar locking mechanism. After the side punches have been successfully installed onto the internal drum 20 using the band template 40 as described above, the cam lever tools 80 and the band template 40 are removed from the internal drum 20.

An alternate technique, illustrated in FIG. 13, for maintaining surface to surface contact between the band template 40 and the imaging surface 26 of the internal drum 20, involves the use of a crowder 110. The crowder 110 generally comprises a flexible compression band 112, preferably formed of a nonabrasive material such as nylon or the like, and a pair of stop blocks 114, 116, positioned on opposing ends of the compression band 112. In operation, the crowder 110 is designed to be positioned onto a portion of the band template 40, as indicated by directional arrow 118, to compress the band template against the internal drum 20. As with the previously described cam lever tool 80, the compressive force supplied by the crowder 110 is applied after the center notch 42 of the band template 40 has been mated with the punch pin 38 of the installed center side punch 70, thereby ensuring that the band template 40 is properly aligned on the internal drum 20.

FIG. 14 illustrates the crowder 110 installed over the band template 40 on the internal drum 20. The crowder 110 is compressed against the band template 40 using a second set of stop blocks 120, 122, mounted to the top of the internal drum 20. To adjust the compressive force applied by the crowder 110, at least one of the stop blocks 114, 116, may be provided with an adjustment mechanism 124. For example, as shown in FIG. 14, the adjustment mechanism 124 may comprise an adjustment screw which passes through the stop block 116 and engages a bottom surface of the stop block 122.

Figure 15:
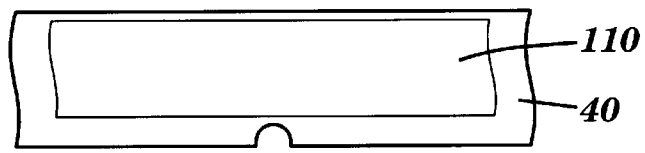
FIG. 15 illustrates the positioning of the crowder on the band template.

When installed on the internal drum 20 as described above, the crowder 110 does not cover the entire width of the band template. As illustrated in FIG. 15, this prevents any interference with the operation of the notches in the band template 40.

Figure 16:
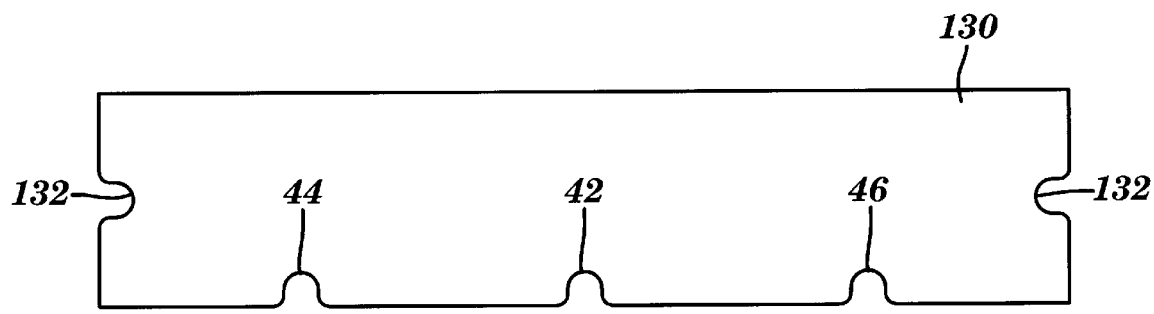
FIG. 16 shows an alternate embodiment of the band template.

An alternate embodiment of a band template 130 in accordance with the present invention is illustrated in FIG. 16. As previously described with regard to the band template 40, the band template 130 includes a center notch 42, a second notch 44, and a third notch 46. Again, the specific number, size, shape, and other attributes of the notches formed in the band template 130 may vary according to the specific side punch configuration to be installed on the internal drum 20. Each end of the band template 130 further includes a notch 132 which is designed to be engaged by an installation tool as described below.

Figure 17:
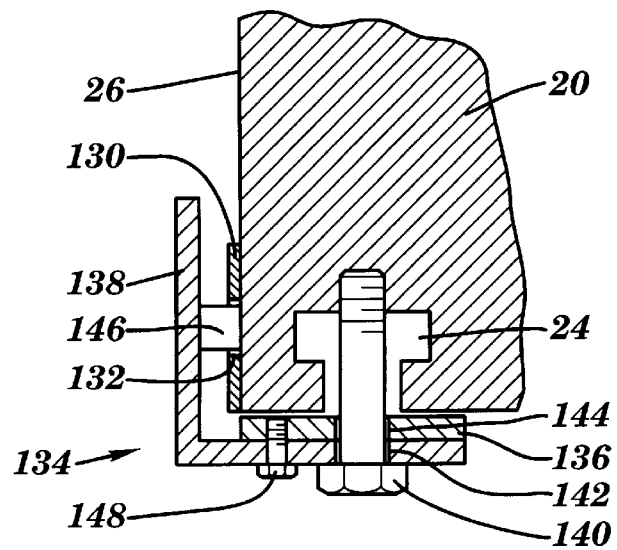
FIG. 17 is a plan view illustrating an installation tool for compressing the band template of FIG. 16 against the imaging surface of the internal drum.

An installation tool 134 for compressing the band template 130 against the imaging surface 26 of the internal drum 20 is illustrated in FIG. 17. A pair of the installation tools 134 (only one of which is shown) are used in a cooperative manner to achieve compression of the band template 130.

The installation tool 134 includes a mount 136 for mounting the tool 134 to the internal drum 20, and a lever 138 for applying a compressive force against the end of the band template 130. The mount 136 is secured to the internal drum 20 using an attachment screw 140. The attachment screw 138 passes through a hole 142 in the lever 138 and a hole 144 in the mount 136. The end of the attachment screw 140 engages the inside surface of the T-slot 24, or extends into a mounting hole (not shown) formed therein. Other mounting arrangements may also be used to secure the installation tool 134 to the internal drum. For example, a T-shaped nut, having a shape which conforms to the shape of the T-slot, may be used.

The lever 138 is designed to be pivoted about the attachment screw 140. To apply a compressive force against the band template 130, the lever 138 of each installation tool 134 is pivoted downward (into the page) such that a pin 146 mounted to an end thereof engages a respective one of the notches 132 formed in the ends of the band template 130. To maintain the compression of the band template 130, the lever 138 is locked in position using a locking screw 148.

In accordance with the present invention, an imagesetter, platesetter, or other type of internal drum imaging system would be built without punches and shipped to a customer site. A punch order indicating the desired location of the side punches, and any other unique punch specifications (e.g., punch type, shape, size, manufacturer, etc.), is transmitted to the factory by the customer before or after receipt of the imaging system. The punch order is specified according to a standard format based on the center of scan of the internal drum or other appropriate criteria. On receipt of the order, the factory fabricates a band template corresponding to the required punch configuration, and manufactures or otherwise provides the necessary side punches. The completed band template and associated side punches are shipped directly to the customer site, where the side punches are aligned and installed on the internal drum as described above using the band template.

A customer may order a plurality of different band templates and associated side punches, and interchangeably install sets of the side punches on the internal drum while on-site, using different band templates. Currently, using prior art punch installation techniques, the entire imaging unit must be shipped back to the factory in order to install and align a different set of punches on the internal drum. Clearly, the present invention increases the productivity and functionality of internal drum imaging systems by simplifying the punch installation process.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

We claim:

1. A method for installing a plurality of punches on an internal drum of an imaging system, comprising the steps of:
   installing a first punch onto the internal drum;
   providing a band template having a plurality of notches each configured to receive a punch pin of one of the plurality of punches therein;
   positioning the band template on the internal drum such that a punch pin of the first punch is located within a predetermined one of the notches in the band template;
   positioning a punch pin of each of the remaining punches to be installed onto the internal drum into an empty one of the notches on the band template; and
   installing each of the remaining punches onto the internal drum.

2. The method for installing punches according to claim 1, further including the step of:
   removing the band template upon installation of the plurality of punches.

3. The method for installing punches according to claim 1, wherein the plurality of punches are side punches.

4. The method for installing punches according to claim 1, further including the steps of:
   locating a center of scan of the internal drum; and
   installing the first punch at the center of scan of the internal drum.

5. The method for installing punches according to claim 1, further including the steps of:
   providing a guide on the internal drum where the punches are to be installed; and
   installing the plurality of punches onto the internal drum such that a portion of each of the plurality of punches contacts a control surface of the guide.

6. The method for installing punches according to claim 5, wherein the guide is a T-shaped slot.

7. The method for installing punches according to claim 5, wherein the plurality of punches are side punches configured to be installed on a side of the internal drum, said method further including the step of:
   forming the guide in the side of the drum where the side punches are to be installed, such that the guide has a curvature corresponding to a curvature of an imaging surface of the internal drum.

8. The method for installing punches according to claim 7, wherein s aid method further including the steps of:
   adjusting a radial location of each side punch along the control surface of the guide to position the punch pin of each side punch into a corresponding one of the plurality of notches in the band template.

9. The method for installing punches according to claim 7, further including the steps of:
   forming a location indicator at a center of scan of the internal drum;
   positioning the first punch at the center of scan using the location indicator; and
   installing the first punch at the center of scan of the internal drum.

10. The method for installing punches according to claim 9, wherein the location indicator includes a pin member, and wherein the step of positioning the first punch at the center of scan using the location indicator further includes the step of:
    aligning the first punch at the center of scan by coupling the pin member with a complementary receiving member on the first punch.

11. The method for installing punches according to claim 1, wherein the step of positioning the band template on the internal drum further including the step of:
    compressing the band template against an imaging surface of the internal drum.

12. The method for installing punches according to claim 1, further including the steps of:
    providing a plurality of band templates, wherein each band template includes a unique arrangement of notches corresponding to the punch pins of a predetermined set of the punches; and
    interchangeably installing the predetermined sets of the punches onto the internal drum using corresponding ones of the plurality of band templates.

13. The method for installing punches according to claim 1, wherein the internal drum is located at a customer location, further including the steps of:
    submitting a specification for the band template to a manufacturing location; and
    providing and shipping the specified band template to the customer location for use in the installation of the punches on the internal drum.

14. The method for installing punches according to claim 13, further includes the steps of:
    submitting a specification for the punches to be installed using the specified band template to a manufacturing location;
    providing and shipping the specified punches to the customer location for installation on the internal drum.

15. An apparatus for installing a plurality of punches onto an imaging system having an internal drum, the apparatus comprising:
- a band template having a plurality of notches each configured to receive a punch pin of one of the plurality of punches therein; and
- a system for compressing the band template against a surface of the internal drum, such that the band template conforms to an imaging surface of the internal drum.

16. The apparatus for installing punches according to claim 15, further including:
- a system for aligning the band template onto the imaging system.

17. The apparatus for installing punches according to claim 16, therein the aligning system includes:
- a system for designating a center of scan of the imaging system;
- a first one of the plurality of punches installed onto the imaging system at the center of scan; and
- a predetermined one of the plurality of notches on the band template;
- wherein a punch pin of the first one of the plurality of punches is located within the predetermined one of the plurality of notches in the band template to align the band template onto the imaging system.

18. The apparatus for installing punches according to claim 17, wherein the system for designating a center of scan of the imaging system further includes:
- a first connection member disposed at the center of scan of the imaging system; and
- a second, complementary connection member on the first one of the plurality of punches for coupling with the first connection member.

19. The apparatus for installing punches according to claim 18, wherein the first connection member includes a pin element protruding from the imaging system at the center of scan, and wherein the second, complementary connection member is a guide element formed on the first one of the plurality of punches for receiving the pin element therein.

20. The apparatus for installing punches according to claim 15, further including:
- a system for installing the plurality of punches onto the imaging system using the band template, such that the punch pin of each of the plurality of punches is disposed within a corresponding one of the notches in the band template.

21. The apparatus for installing punches according to claim 20, wherein the installing system includes a guide on the imaging system for displaceably locating the plurality of punches along an imaging surface of the imaging system.

22. The apparatus for installing punches according to claim 21, wherein the guide includes a control surface for contacting a corresponding control surface on each of the plurality of punches.

23. The apparatus for installing punches according to claim 21, wherein the imaging system includes an internal drum, and wherein the guide has a curvature corresponding to a curvature of an imaging surface of the internal drum.

24. The apparatus for installing punches according to claim 23, wherein a radial location of each of the plurality of punches along the guide is defined by the notches in the band template.

25. The apparatus for installing punches according to claim 21, wherein the guide is a T-shaped slot.

26. The apparatus for installing punches according to claim 21, further including:
- a system for securing each of the plurality of punches to the imaging system at distinct locations along the guide.

27. The apparatus for installing punches according to claim 15, wherein the band template has a substantially planar configuration, and is formed of a flexible material.

28. The apparatus for installing punches according to claim 27, further including:
- an system for forcing the band template to conform to a shape of an imaging surface of the imaging system.

29. The apparatus for installing punches according to claim 28, wherein the forcing system engages opposing ends of the band template to compress the band template against the imaging surface of the imaging system.

30. The apparatus for installing punches according to claim 28, wherein the forcing system engages a first side of the band template to compress an opposing side of the band template against the imaging surface of the imaging system.

31. A method for installing a plurality of punches on an internal drum of an imaging system, comprising the steps of:
- providing a band template having a plurality of notches therein;
- positioning the band template onto the imaging system; and
- installing a plurality of punches onto the imaging system, such that a punch pin of each of the plurality of punches is disposed within a respective one of the plurality of notches in the band template.

32. A method for installing side punches onto an internal drum of an imaging system, comprising the steps of:
- positioning a template on an imaging surface of the internal drum, the template having a plurality of notches therein; and
- installing a plurality of side punches onto the internal drum, such that a punch pin of each of the plurality of side punches is disposed within a respective one of the plurality of notches in the template.

* * * * *

UNITED STATES PATENT AND TRADEMARK OFFICE
CERTIFICATE OF CORRECTION

PATENT NO. : 5,996,206
DATED : December 7, 1999
INVENTOR(S) : Richard J. Lynch, et al.

It is certified that error appears in the above-identified patent and that said Letters Patent is hereby corrected as shown below:

On the title page, item [73] change "Calif." to --MA.--.

Signed and Sealed this

Eighth Day of August, 2000

Attest:

Q. TODD DICKINSON

Attesting Officer

Director of Patents and Trademarks